(12) United States Patent
Jackson

(10) Patent No.: US 8,509,374 B2
(45) Date of Patent: Aug. 13, 2013

(54) PRODUCING A DESIGN FOR A NUCLEAR FUEL ELEMENT

(75) Inventor: Gerald Peter Jackson, Lisle, IL (US)

(73) Assignee: HBar Technologies, LLC, West Chicago, IL (US)

( * ) Notice: Subject to any disclaimer, the term of this patent is extended or adjusted under 35 U.S.C. 154(b) by 1020 days.

(21) Appl. No.: 11/595,100

(22) Filed: Nov. 9, 2006

(65) Prior Publication Data

US 2007/0140401 A1 Jun. 21, 2007

Related U.S. Application Data

(63) Continuation-in-part of application No. 11/590,036, filed on Oct. 30, 2006, which is a continuation-in-part of application No. 11/593,245, filed on Nov. 6, 2006, application No. 11/595,100.

(60) Provisional application No. 60/735,108, filed on Nov. 9, 2005, provisional application No. 60/731,971, filed on Oct. 31, 2005, provisional application No. 60/734,126, filed on Nov. 7, 2005.

(51) Int. Cl.
*G21C 19/00* (2006.01)

(52) U.S. Cl.
USPC ............ 376/251; 376/409; 376/253; 376/438

(58) Field of Classification Search
USPC .................. 376/405, 409, 251, 253, 438, 913
See application file for complete search history.

(56) References Cited

U.S. PATENT DOCUMENTS 4,477,411 A * 10/1984 Hindle ........................ 376/412

OTHER PUBLICATIONS

Kammash, T., Antiproton-Driven Gas Core Fission Rocket, 55th International Astronautical Congress of the International FAstronautical Federation, Oct. 4-8, 2004, pp. 1.*
Nickel et al., Long time experience with the development of HTR fuel elements in Germany, Nuclear Engineering and Design, Mar. 14, 2002, vol. 217, pp. 141-151.*
Antimatter Catalyzed Nuclear Pulse Propulsion, Apr. 24, 2004.*
Dubrovin et al., Improvement of the Design of the Series-Produced Fuel Element of the VVER-440 Reactor to Increase Burnup, Feb. 1992, Plenum Publishing Corp., pp. 114-118.*
S. Schmid et al., Probability of fission induced by 1.2 GeV antiprotons, Z.Phys. A 359, pp. 27-33 (1997).*
Armstrong et al., Fission of heavy hypernuclei formed in antiproton annihilation, May 1993, The American Physical Society, vol. 47, No. 5, pp. 1957-1969.*
Kammash, T., JIMO Mission with Antiproton Powered Gas Core Fission Rocket, Jul. 2005, American Institiute of Aeronautics and Astronautics, pp. 1-5.*

* cited by examiner

*Primary Examiner* — Timothy A Brainard
(74) *Attorney, Agent, or Firm* — Peter K. Trzyna, Esq.

(57) ABSTRACT

Method including: inducing, with antiprotons, nuclear fission in a material, such as depleted uranium; measuring leakage of radioactive byproduct produced by the fission; and producing, responsive to the measuring, a design for the nuclear fuel element. Apparatus, manufactures, and products produced by the method can be encompassed.

20 Claims, 4 Drawing Sheets is an illustration of an embodiment.

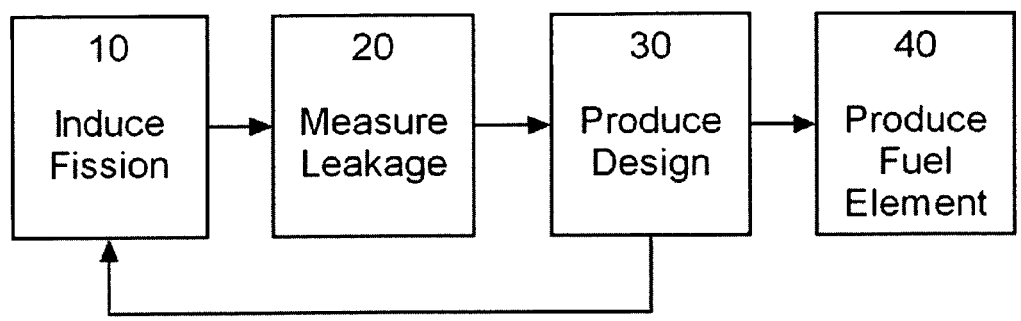
Figure 1 is an illustration of a process.
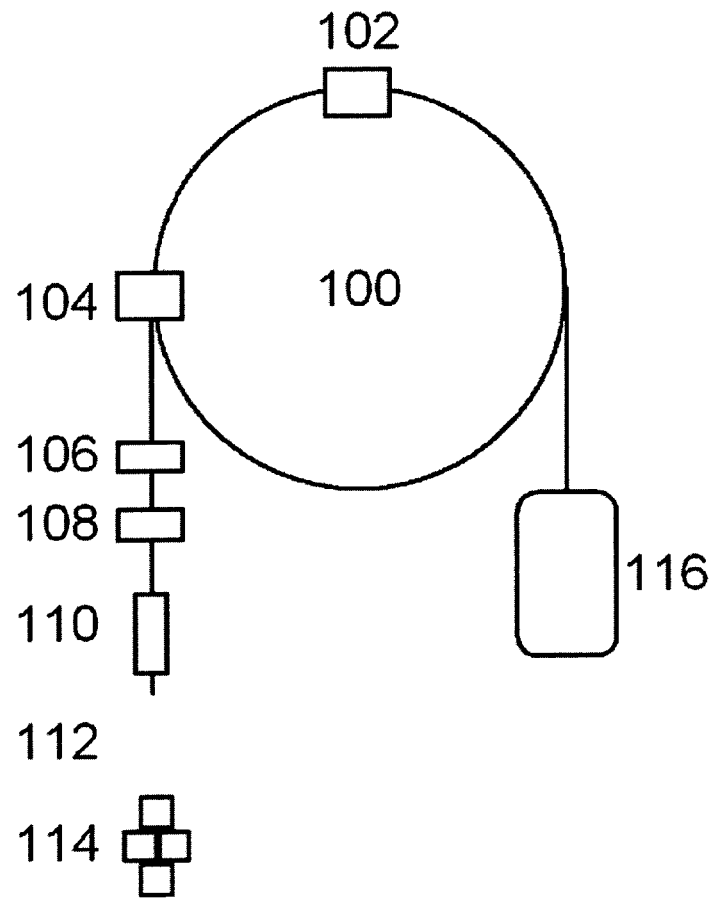
Figure 2 is a schematic representation of an embodiment.

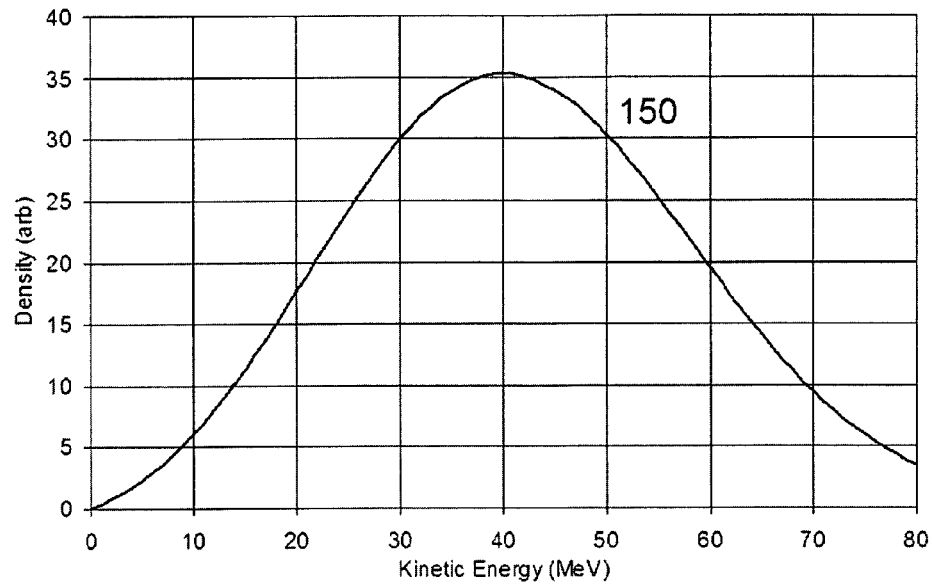
Figure 3 is an illustration of an embodiment concerning antiproton energy spectrum after deceleration.
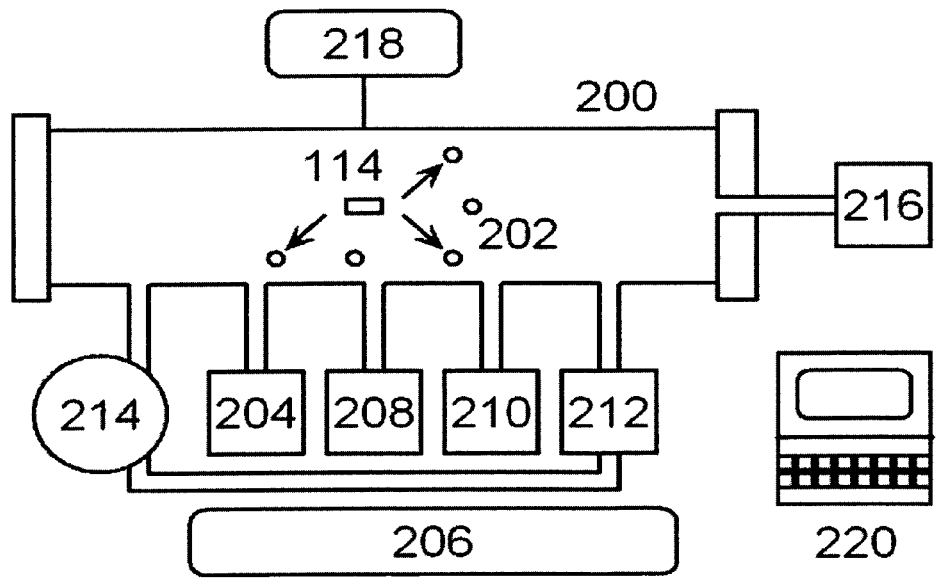
Figure 4 is an illustration of an embodiment.

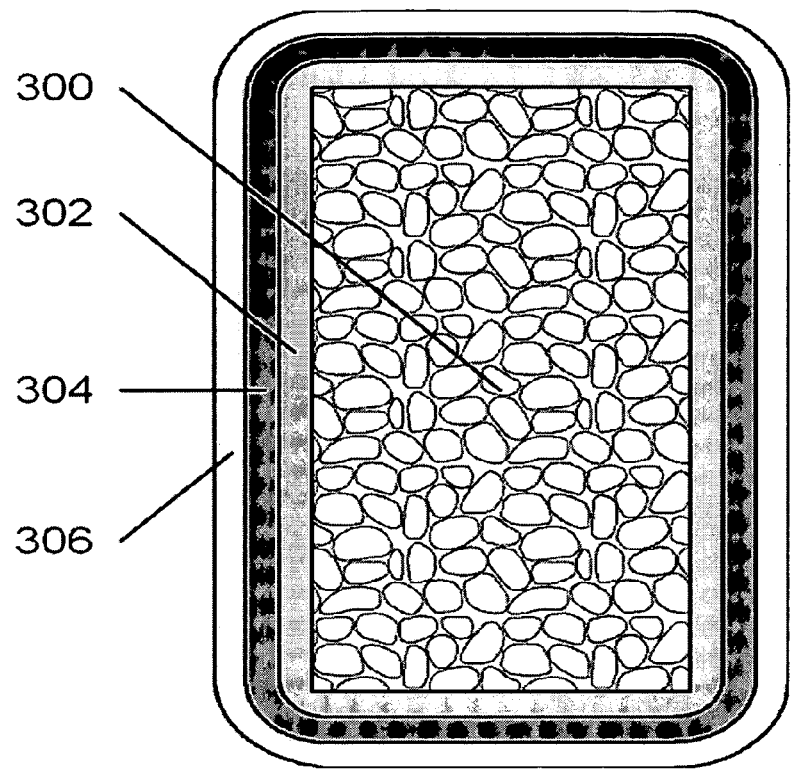
Figure 5 is an illustration of an embodiment.
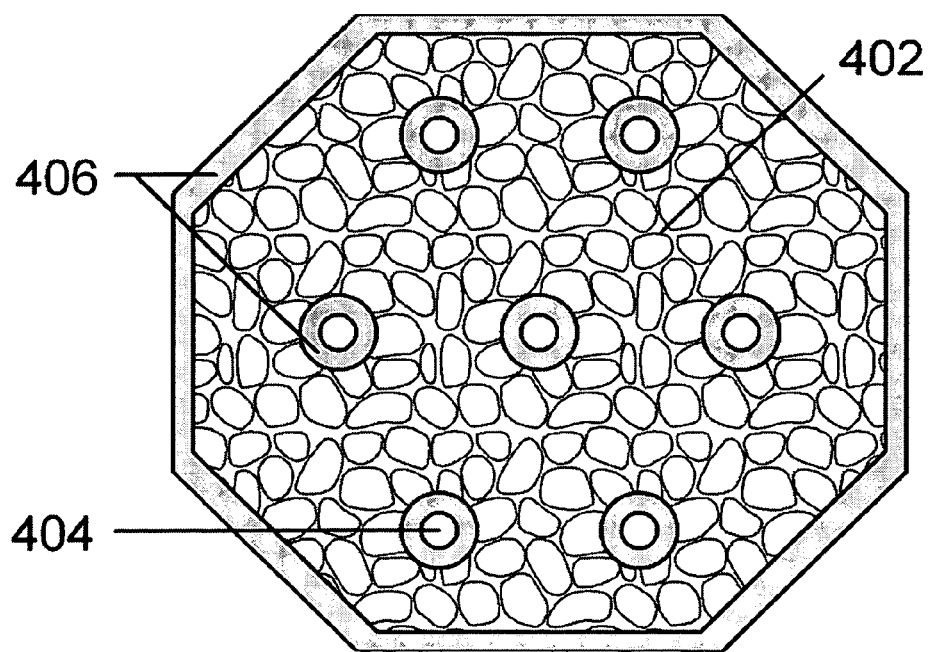
Figure 6 is an illustration of an embodiment.

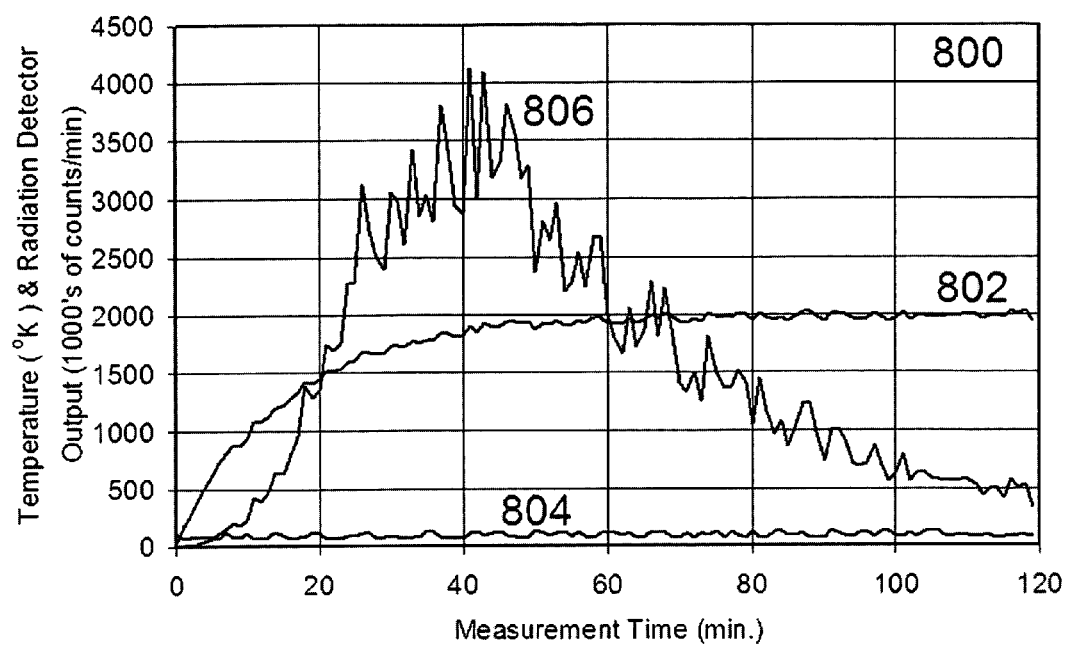
Figure 7 is an illustration of an embodiment.

PRODUCING A DESIGN FOR A NUCLEAR FUEL ELEMENT

I. CONTINUITY STATEMENT

The present patent application incorporates by reference from all patent applications listed below. The present patent application claims benefit of Ser. No. 60/735,108, filed Nov. 9, 2005, and is a continuation-in-part of Ser. No. 11/590,036, filed on Oct. 30, 2006, which in turn claims benefit from Ser. No. 60/731,971, filed Oct. 31, 2005.The present patent application is a continuation-in-part of Ser. No. 11/593,245, filed Nov. 6, 2006, which in turn claims benefit from Ser. No. 60/734,126, filed Nov. 07, 2005.

Incorporated by reference are: "Particle Beam Processing System," U.S. Pat. No. 6,838,676, issued on Jan. 4, 2005; and "Deceleration of Hadron Beams in Synchrotrons Designed for Acceleration," U.S. Pat. No. 6,822,405 issued on Nov. 23, 2004.

II. BACKGROUND OF THE INVENTION

A. Field of the Invention
The technical field is antiprotons.
B. Summary of the Invention
Depending on the implementation, there is apparatus, a method for use and method for making, and corresponding products produced thereby, as well as manufactures, and necessary intermediates of the foregoing, each pertaining to embodiments herein. Embodiments herein include testing and designing, regarding a fuel element such as a nuclear fuel.

IV. BRIEF DESCRIPTION OF THE DRAWINGS

FIG. 1 is an illustration of a process
FIG. 2 is an illustration of an embodiment.
FIG. 3 is an embodiment of an antiproton energy spectrum after deceleration.
FIG. 4 is an illustration of a representation of an embodiment.
FIG. 5 is an illustration of a representation of an embodiment.
FIG. 6 is an illustration of a representation of an embodiment.
FIG. 7 is an illustration of a representation of an embodiment.

V. MODES

Antiprotons are annihilated upon contacting matter. If the matter is composed of elements with atomic numbers greater than or equal to 92 (transuranic), there is a 98% or greater probability of inducing nuclear fission in those elements. This fission probability does not depend on the isotope of those elements exposed to the antiprotons. Alternatively, when antiprotons irradiate materials with atomic number less than 92, less than two percent of the reactions produce fissions.

FIG. 1 provides an illustration of an embodiment in which a process can include, at block 10, inducing, with antiprotons, nuclear fission in a test sample or other mass containing transuranic material. At block 20 there can be measuring leakage of radioactive byproduct produced by the fission referenced at block 10. Block 30 represents producing, responsive to the measuring at block 20, a design for the nuclear fuel element. The design parameters can include test sample composition and density and the compositions, number, and thicknesses of coatings over the test samples. This design can be validated by using the design in block 30 to generate an updated test sample and repeating the process starting at block 10. Representing an embodiment wherein operational fuel elements are produced, block 40 presents the production of those full nuclear fuel elements.

FIG. 2 provides a representative illustration of an embodiment wherein there is one manner of inducing, with antiprotons, nuclear fission in a transuranic material, with means therefore. See, e.g., FIG. 1, block 10. FIG. 2 illustrates a particle accelerator 100 which can be used to accelerate or decelerate antiprotons. In one embodiment the particle accelerator 100 is stationary, located where the nuclear testing is taking place, see, e.g., FIG. 1, block 20. In another embodiment, the particle accelerator 100 is portable, and is used to store and then transport the antiprotons to the location where nuclear testing is taking place again, see, e.g., FIG. 1, block 20.

When it is time to extract antiprotons from the particle accelerator 100, one embodiment calls for an extraction kicker magnet 102 to fire and deflect the antiprotons into the extraction channel at a septum magnet 104. In one embodiment, the septum magnet is a Lambertson magnet. Once the antiprotons are in a transfer line between the particle accelerator 100 and the samples 114 composed of transuranic materials, there exist embodiments wherein steering 106 and/or focusing 108 magnets are employed.

Consider an embodiment wherein the mean kinetic energy of the antiprotons incident on the samples 114 is reduced below the minimum energy of the accelerator 100 through the use of a degrader 110. A degrader 110 is material through which the antiprotons traverse in orderto give up their kinetic energy. Consider the teachings in: "Particle Beam Processing System," U.S. Pat. No. 6,838,676, naming as inventor Gerald P. Jackson, issued on Jan. 4, 2005; which has been incorporated by reference. FIG. 3 contains one embodiment of the antiproton kinetic energy distribution 150 after a degrader 110. As a lower mean kinetic energy is desired, the survival efficiency of the antiprotons in the degrader 110 decreases rapidly. Between the degrader 110 and the samples 114, either an evacuated vacuum chamber or an air gap 112 can be used during nuclear testing.

In an embodiment wherein an already existing proton accelerator used to manipulate antiprotons, the extraction of antiprotons from the particle accelerator can utilize accelerator hardware for proton injection. Antiproton extraction can performed using a proton injection kicker 102 and Lambertson magnets 104. Modifications to the kicker trigger and timing systems can account for a timing difference between the protons and antiprotons, which travel in the same accelerator vacuum chamber but in opposite directions.

In an alternative embodiment, the antiprotons can be extracted from a portable antiproton bottle 116 and targeted directly onto the samples 114, bypassing the particle accelerator 100.

In another embodiment, antiprotons can be generated and used in experimental studies typically performed by using large particle accelerators, such as the Tevatron at the Fermi National Accelerator Laboratory (Fermilab). The Fermilab accelerator complex includes various linear accelerators and synchrotrons to generate antiprotons, to accelerate these antiprotons to very high energies and momenta (typically to 1 TeV), and to collide these antiprotons together with protons. The results of the collisions can be analyzed to provide information regarding the structure and physical laws of the universe, and more particularly, embodiments herein.

If the existing sources of antiprotons at such accelerators are to be used as sources of antiprotons for these other fields, the antiprotons can be decelerated (i.e., energy and momentum of the antiprotons will have to be reduced). Consider the use of the Main Injector at the Fermi National Accelerator Laboratory (FNAL) in Batavia, Ill. as a particle decelerator (instead of its nominal role as an accelerator), and incorporated by reference are U.S. Pat. Nos. 6,838,676 and 6,822,045. In addition, to provide antiprotons to locations that are off-site from the particle accelerators, the antiprotons have to be decelerated sufficiently to enable them to be stored in a portable synchrotron or cyclotron, or trapped in a bottle and transported to other locations.

Accordingly, testing can be carried out by transporting a sample of transuranic material to a particle decelerator that lowers the kinetic energy of a beam of antiprotons before irradiation of the material. Yet another embodiment can utilize a portable particle decelerator can be brought to the material testing site.

In another embodiment, a bottle of antiprotons can be brought to the material testing site. The antiprotons can be stored directly as a distribution of atomic ions of antihydrogen, or can be stored and transported as either atomic or molecular antihydrogen. In a more general embodiment, the antiprotons can be stored and transported as a constituent of any isotope or molecule of antimatter.

The bottle in the above embodiments can be based on electrostatic confinement, as in: "Electrostatic Bottle for Charged Particle Storage," Ser. No. 60/731,971, naming as inventor Gerald P. Jackson, filed Oct. 31, 2005; and that U.S. Patent Application titled "Containing/Transporting Charged Particles", naming as inventor Gerald P. Jackson, filed on Oct. 30, 2006, and having express mail label EQ139851562US. Compare this view with "Container for Transporting Antiprotons," U.S. Pat. No. 5,977,554 issued to Gerald A. Smith, et al. on Nov. 2, 1999 and "Container for Transporting Antiprotons," U.S. Pat. No. 6,160,263 issued to Gerald A. Smith, et al. on Dec. 12, 2000.

FIG. 4 is a representative illustration of an embodiment wherein there is measuring leakage of radioactive byproduct produced by the fission, e.g., the aforementioned testing. In this embodiment, the test and/or measurement procedure performed on the test sample(s) can include inserting each test sample 114 into a sealed vacuum chamber 200. As a function of test sample temperature, the release of radioactive isotopes 202 into the vacuum chamber 200 is measured by capturing these isotopes 202. In an embodiment, this capture process occurs within the titanium plates of an ion-sputter pump 204. Near the ion-sputter pump can be a radiation detector 206. In another specific embodiment, this capture process can occur in getter materials which are incorporated into one or more types of vacuum pump, including titanium sublimation 208, sorption 210, or cryo pumps 212. Another embodiment calls for circulating helium gas through the vacuum chamber 200 and a cryogenic sorption pump 212 using a helium circulation pump 214. In yet another embodiment, this capture occurs in a residual gas analyzer detector 216, wherein ionized atoms of materials migrating out of the test sample 114 are separated and recorded as a function of atomic mass. The temperature of the test sample 114 is increased through the use of a heater 218.

During the above measurement, one or more parameters can be recorded, including: test sample 114 temperature; air/gas pressure in the vacuum chamber 200; ion-sputter pump 204 current; cryo pump 212 cryostat surface temperature; ion current in the residual gas analyzer detector 216; and gamma-ray spectrum measured by the radiation detector 206. The data can be recorded, either electronically or through manual input, on a device 220, which can represent a means for producing a measurement of leakage of the byproduct to produce a graphic representation of the measured leakage. Device 220 can comprise a computer, preferably with a USB port, connected to a data acquisition system comprising analog-to-digital converters linked to thermocouples. The "means for" can be engaged in measuring test sample temperature 802, and scalar modules can be utilized in counting and recording integrated count rates each minute 806 from the radiation detector next to the ion pump. Device 220 can really be any device capable of producing a measurement of leakage of the byproduct to produce a graphic representation of the measured leakage, or in another manner of thinking, performing data analysis and summarizing the results. This summarization is incorporated into the written design for the nuclear fuel element.

In one exemplary embodiment, intended to illustrate data recording and analysis, FIG. 7 teaches that output 800 from the data recording and analysis device 220 which is a part of an embodied measurement apparatus as illustrated in FIG. 4. While other parameters can be used, in this particular embodiment, the parameters that are displayed in the output 800 are the temperature 802 of the test sample 114 and the integrated gamma-ray counts each minute 806 recorded by the radiation detector 206 placed near a ion-sputter pump 204 used to capture particles that diffused out of the heated test sample 114 previously exposed to antiprotons. Accordingly, curve 806 is a graphic representation of the leakage in this particular example. Note that as the test sample temperature 802 increases, the diffusion of fission byproduct increases exponentially. But because a given number of antiprotons will only produce a fixed number of byproduct, eventually the byproduct population is depleted and the count rate 806 falls off with time. An example of analysis is the summation of the total number of counts 806 during the 2-hour measurement interval in the FIG. 7 embodiment. Another analysis can involve subtraction of the above count rate from the count rate 804 from a test sample that was never exposed to antiprotons. Note that the background count rate 804 can also be a goal of the nuclear fuel element design process, where the ideal cermet composition and coating prescription produces a test sample 114 that does not leak unacceptable fission byproduct. This subtracted, or net, emission rate can be a figure of merit in the nuclear fuel element design process.

Representatively, another way of conducting the measuring is (e.g., after storing and transporting antiprotons to a site of the testing) accelerating the antiprotons to high energy to penetrate test samples and expose the transuranic materials in one or more samples, and then measuring the samples to detect the effects of the fission reactions induced by the antiprotons.

One way to view the teachings herein is in using antiprotons to test fission processes using readily available depleted uranium in contrast to using rare, dangerous, and protected fissionable materials such as enriched uranium and plutonium.

Typically, fission processes are tested using such rare, dangerous, and protected fissionable materials by placing them in a field of neutrons. Especially in the case of testing enriched uranium based fission processes, the ability to substitute the safer, plentiful, and easily available depleted uranium reduces cost and security concerns. This ability to use depleted uranium, without affecting the chemistry of the underlying material being tested, enables nuclear research to be performed at smaller companies at less cost and with less security and safety concerns. Accordingly, one embodiment comprises testing fission product retention with safe isotopes uranium (such as depleted uranium) and/or other such fissionable elements by using antiprotons to induce the fissions.

Thus, illumination of coated samples of depleted uranium oxide produces fissions in the central uranium region but can produce little else in the coatings. In addition, the number of fissions is controlled by precisely controlling the number of antiprotons illuminating the target. This enables a sufficiently high amount of fission to occur for detection but does not produce a sample so radioactive that it requires handling at special institutions.

In another embodiment, samples of depleted uranium oxide, e.g., particles, wires, foils, or the like, are coated with candidate layers of material. One approach is a combination including tungsten, rhenium, and/or molybdenum. Fission is induced in the depleted uranium in order to produce the entire range of fission products. The result then placed into a furnace and heated to temperatures reminiscent of operation of the NTR, e.g., greater than 2,000° K. Presence of elements above mass four can be detected in the spectrometer if they are able to diffuse out of the cermet.

FIG. 5 is a representative illustration of an embodiment wherein there is producing, responsive to the measuring, a design for the nuclear fuel element. Design details can a be matter of preference or choice, or a reflection of the particulars of the application or environment in which the design is to be implemented. However, as to the embodiments herein, design parameters can include test sample 114 composition and density and the composition(s), number, and thickness(es) of coating(s) over the test sample(s) 114 or mass. In one embodiment, the core 300 of a test sample can be comprised of a mixture of transuranic material and high temperature refractory metal(s) that is pressed and sintered into a solid, e.g., a solid block. The transuranic material can be depleted uranium oxide. The refractory materials can include at least one of tungsten and rhenium. Similarly, in another embodiment, the core 300 can comprise a mixture of transuranic material and high temperature graphite.

In yet another embodiment, the cermet core 300 can be coated by one 302, two 304, or more 306 layers of materials that can in concert inhibit the high temperature diffusion of radioactive fission byproducts out of the test sample 114 or other mass. The composition and thickness of each coating, and the total number of coatings, can be ingredients of a nuclear fuel element design.

FIG. 6 is a representative illustration of an embodiment wherein there is producing the nuclear fuel element. The cermet 402 can be extruded, leaving channels 404 for the flow of hydrogen gas necessary for cooling in a power reactor or generating thrust in a propulsion system. In this embodiment, design parameters are evolved according to the process in FIG. 1, e.g., to determine the composition of the cermet 402, and the composition(s), thickness(es), and number of layers of the diffusion-inhibiting coating(s) 406 inside the hydrogen channels 404 and on the outside of the cermet 402, etc.

The fuel element can be utilized in a nuclear propulsion system based on antiproton-induced fissions of depleted uranium in the form of a sail. In such a propulsion system there can be a thin foil of depleted uranium is irradiated with antiprotons.

Some embodiments herein are directed, generally, to nuclear fuel element for a thermal rocket (NTR) system (or other vehicle) and reducing emission of radioactivity via the engine exhaust. For general perspective, if fission products leak into the exhaust, the NTR may only be allowed to operate from High Earth Orbit (HEO), which for certain applications may involve the addition of a "shuttle" to go from Low Earth Orbit (LEO) to HEO and negates much of the advantage of the high specific impulse NTR. In contrast, embodiments described herein pertain to a fuel that inhibits the emission of radioactive atoms into the exhaust stream, enabling an NTR to be considered for an increased range of operations, e.g., in space. Embodiments herein therefore can extend to improved coated cermet fuel elements to retain fission products and prevent diffusion into the exhaust.

Note that the foregoing is a prophetic teaching and although only a few exemplary embodiments have been described in detail herein, those skilled in the art will readily appreciate from this teaching that many modifications are possible, based on the exemplary embodiments and without materially departing from the novel teachings and advantages herein. Accordingly, all such modifications are intended to be included within the scope of the defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

The invention claimed is:

1. A process comprising:
   inducing, with antiprotons, nuclear fission in a material, and then
   measuring leakage of radioactive byproduct produced by the fission, and then
   repeating said inducing and then said measuring until producing, responsive to said inducing and then said measuring, a design for a nuclear fuel element.

2. The process of claim 1, further including: producing the nuclear fuel element according to the design.

3. A product produced by the process of claim 2, the product comprising the nuclear fuel element.

4. The process of claim 1, wherein said material includes depleted uranium.

5. The process of claim 1, wherein said design specifies a number of coating layers.

6. The process of claim 1, wherein said design specifies a thickness of each coating layer.

7. The process of claim 1, wherein said design specifies a composition of each coating layers.

8. A process of measuring fission daughter migration out of at least one nuclear rocket fuel element sample, the method comprising:
   exposing at least one sample of a nuclear rocket fuel element to antiprotons, and then
   heating said at least one sample to nuclear rocket operational temperatures, and then
   measuring the emission of fission daughters from said at least one sample.

9. The process of claim 8, wherein said at least one sample does not contain enriched uranium.

10. The process of claim 9, further including: producing, responsive to the measuring, a design for a nuclear fuel element.

11. The process of claim 10, further including: producing the nuclear fuel element according to the design.

12. A product produced by the process of claim 10, the product comprising the nuclear fuel element.

13. The process of claim 9, wherein said sample includes depleted uranium.

14. The process of claim 8, wherein said heating, exposing, and measuring take place concurrently.

15. A process comprising:
   inducing, with antiprotons, nuclear fission in a material to produce radioactive byproduct, and then
   measuring leakage of the byproduct so as to produce a graphic representation of the leakage.

16. The process of claim 15, further including producing, responsive to the measuring, a design for a nuclear fuel element.

17. The process of any one of claims 1, 10, 16, wherein the producing a design for the nuclear fuel element comprises computer processing in producing the design for the nuclear fuel element.

18. Apparatus including:
   means for inducing, with antiprotons, nuclear fission in a material to produce radioactive byproduct; and
   means for producing a measurement of leakage of the byproduct so as to produce a graphic representation of the measured leakage.

19. The apparatus of claim 18, further including a design for a nuclear fuel element generated responsive to the measurement.

20. The apparatus of claim 18, further including a nuclear fuel element produced according to a design.

* * * * *